Patented Mar. 26, 1935

1,995,954

UNITED STATES PATENT OFFICE 1,995,954

RUST-RESISTING COATING COMPOSITION

Herbert O. Albrecht, Flint, Mich., assignor to E. I. du Pont de Nemours & Company, Wilmington, Del., a corporation of Delaware No Drawing. Application June 10, 1931, Serial No. 543,496

5 Claims. (Cl. 134—26)

This invention relates to improved coating compositions containing phosphoric acid and actively rust-inhibiting derivatives thereof, as rust-resisting agents, and more particularly it relates to a new method of attaining stable mixtures of these agents in paints and varnishes for the production of coating compositions having superior rust-inhibiting characteristics.

Phosphoric acid, and materials having essentially the same action on the metal substrate (usually under the influence of heat), such as acid phosphates, and easily decomposable phosphates, have been used in paints for the purpose of increasing the resistance of the coated metal to rusting and to obtain other desirable effects. Free phosphoric acid is, insofar as I am aware, the most effective of these agents for the purpose mentioned. I have observed, however, that free phosphoric acid is not soluble in any of the usual paint materials and that the imperfect distribution of the phosphoric acid and its presence in an insoluble state results in a coating composition in which the advantages of phosphoric acid as a rust-resisting agent are but partially realized. Following this observation, I have discovered that marked improvements in these phosphoric acid-containing coating compositions are brought about by incorporating the phosphoric acid so as to produce a solution of the acid in the composition as will more fully appear hereinafter. Among the disadvantages resulting from the presence of the phosphoric acid in insoluble form is the tendency of all or part of this agent to settle out of the paint mixture upon standing. This objection in some instances is a serious one, inasmuch as it is quite difficult to redisperse the phosphoric acid with the paint materials. Further disadvantages of directly incorporating the phosphoric acid into the coating composition according to the prior practice is the ready attack of metal containers by the phosphoric acid and the undesirable bodying effects due to a fine dispersion and adsorption of phosphoric acid, especially in asphaltic and pigmented products.

This invention has as an object an improved rust-resisting coating composition containing phosphoric acid which is substantially free from the disadvantages of prior compositions of this type.

This object is accomplished by the following invention in which a suitable amount of solvent, miscible with both phosphoric acid and paint and varnish solvents, is added to the coating composition. The phosphoric acid is preferably dissolved in a solvent of the type mentioned and the resulting mixture added to the paint or varnish.

In carrying out this invention organic compounds of the class of saturated monohydric alcohols of the aliphatic series have been found most effective, as blending agents for phosphoric acid and the paint and varnish materials. The amounts in which the alcohols are used vary from case to case, but can be easily determined by simple experiment. In many cases a few trials with different amounts of alcohol added to the desired ratios of phosphoric acid and paint or varnish material will determine with sufficient accuracy for practical purposes the amount necessary to produce a homogeneous mixture. The acid should preferably be dissolved in the alcohol before adding to the paint or varnish, since the acid, once separated in the final mixture, is relatively slow to dissolve, even though it eventually will do so. In the case of dark or opaque paints and varnishes, it is permissible to use the thinner alone in making this test, since the solid paint and varnish ingredients tend, if anything, to increase the solubility of the acid.

A more methodical procedure for determining the amount of alcohol necessary is as follows: Given weights of the desired varnish or thinner are titrated with a series of solutions of phosphoric acid in varying amounts (say, 1%, 5%, 10% and 20%) in the chosen alcohol until, in each case, after vigorous stirring, a slight cloudiness is seen. If great accuracy is necessary, the temperature should correspond to the lowest to which the paint or varnish is to be subjected in actual use. The results of the titrations should be calculated and plotted as percentages of acid in paint or varnish against alcohol just necessary to cause solution. By interpolation (reading of the curve drawn through the points) the alcohol necessary for just holding the desired amount of acid in solution can be read off. In practice it may be desirable to add more than this amount of alcohol as a factor of safety. As small a water content as possible of both acid and alcohol used is desirable in promoting solubility.

The choice of alcohol is governed by the fact that with increasing length of carbon chain the miscibility with paint and varnish thinners increases while the miscibility with phosphoric acid decreases. I have found that the most practical compromise is usually commercial butyl alcohol, though the amyl alcohols are nearly as useful. Alcohols of greater molecular size than the five atom series or smaller than the four atom series are less useful.

After the quantity of the alcohol to be used has been determined upon, the corresponding solution of the acid is made up. To properly incorporate the (usually small) amount of this solution in the paint or varnish, it is usually desirable to mix it thoroughly, using a mechanical stirring device with 2 to 4 times the amount of paint or varnish. This mixture can then be incorporated with the remaining paint or varnish with the assurance that thorough mixing has been accomplished.

The following examples are a more specific illustration of the method of carrying out the invention:

*Example I*

| | Parts by weight |
|---|---|
| Paint | 1000 |
| Commercial (70–88%) phosphoric acid | 5 |
| Butyl alcohol | 20 |
| Kerosene | 180 |

These ingredients were compounded in the following manner, the parts by weight in the above formula being taken as pounds. The phosphoric acid was dissolved in the butyl alcohol and to the solution were added, while stirring vigorously, 100 pounds of the paint and 20 pounds of kerosene. After ten minutes stirring, the resultant liquid was stirred into the remaining 900 pounds of the paint and 180 pounds of kerosene while agitating at a rate which need not be especially vigorous.

The paint referred to above is a commercial black baking enamel of 50% solids which is ordinarily further reduced 20% before use. Paints of this type, as well understood by those skilled in the art, may be made up from a varnish base comprising asphalt, various resins, linseed oil, other usual varnish ingredients, and a suitable solvent mixture. The varnish base is then mixed with a paint base consisting of about 24% black pigment such as carbon black, about 55% of the varnish mentioned above, and about 21% raw linseed oil.

*Example II*

| | Parts by weight |
|---|---|
| Synthetic resin varnish | 100.0 |
| Commercial phosphoric acid | 0.5 |
| Butyl alcohol | 5.0 |

The synthetic resin varnish is composed of:

| | Parts by weight |
|---|---|
| Polyhydric alcohol-polybasic acid resin | 6.5 |
| Linseed oil modifier | 3.5 |
| Aromatic solvent | 15.0 |

The butyl alcohol and phosphoric acid are mixed and vigorously stirred with about 10 parts of the synthetic resin varnish, and the resultant material is added to the remaining 90 parts of varnish with ordinary stirring.

The synthetic resin, as well understood by those skilled in the art, is conveniently made by heating together glycerol and phthalic anhydride, a fatty oil or acid (as linseed oil or linseed oil acids) being usually added to the reaction mixture to improve the film-forming characteristics of the resin.

With respect to the quantity of alcohol necessary to dissolve a satisfactory amount of phosphoric acid in a paint or varnish thinner, it may be noted that 7.5 parts of commercial butyl alcohol were found necessary to dissolve one per cent of 88% ortho-phosphoric acid in 100 parts of kerosene at room temperature. Kerosene has the least tendency of any of the common paint and varnish thinners to dissolve phosphoric acid. Successively smaller amounts of butyl alcohol will suffice when lighter petroleum thinners, turpentine, or aromatic solvents, are used. The amount of phosphoric acid that it is desirable to use is usually not lower than 0.25% or greater than one per cent. Thus, I have found that phosphoric acid in amounts as low as 0.25% will give a noticeably improved rust-resistance to the paint set forth in the example. Although increasing the phosphoric acid content of the paint increases the rust resistance, up to about 4%, I have found that amounts above one per cent retard the dry so much that they are not usually practical. It is desirable to have a ratio of butyl alcohol to phosphoric acid not less than 4 to 1 in order to provide a reasonable safety factor. However, greater amounts of the alcohol, up to 20%, will do no harm.

While the preferred practice of the invention consists in using the alcohol solvent in an amount sufficient to maintain all of the acid in solution in the paint or varnish, it is to be understood that the use of aliphatic monohydric alcohols with straight or branched carbon chains in conjunction with phosphoric acid in paint and varnish materials in any proportion, whatsoever, lies within the spirit of my invention, since even the smallest amount of alcohol brings some phosphoric acid into solution, as well as introducing the rest of the acid into the paint or varnish in a manner favorable to very good dispersion of the acid.

It is to be understood, for the purposes of the present invention, that the phosphoric acid is said to be in solution in the paint or varnish when the acid cannot be separated, even in part, by settling or by centrifuging.

Various ways of incorporating the alcohol and phosphoric acid into the coating composition may be used, and it is to be understood, therefore, that the invention is not limited as to a definite order of mixing the ingredients. Another method consists in mixing the phosphoric acid with the varnish base, and then thinning with the hydrocarbon and butyl alcohol, singly or mixed, depending on the temperature. In this method the acid readily emulsifies with the varnish base and the emulsion becomes a solution when the alcohol is added. The alcoholic solution of phosphoric acid could be added to the thinner and the whole added to the varnish base, but this procedure is generally undesirably because the base must usually be hot, which results in a tendency to esterify the alcohol and acid and to decompose the organic materials in the presence of the strong acid.

Various other organic solvents for the phosphoric acid, such as acetone and homologs, formic acid and homologs, cyclohexanol, phenols, etc., can be used but these are not only more expensive but are, for other reasons, much less satisfactory than the aliphatic monohydric alcohols.

The invention may be used to advantage in all cases where the addition of phosphoric acid to a paint or varnish is indicated. The phosphoric acid is distributed as a solution or dispersion throughout the coating composition, and in addition to this advantage of homogeneity, a further advantage resides in the effect of the alcohol in counteracting the tendency of the composition to body. While the invention is, for these reasons, most advantageously practiced with phosphoric acid, the invention is, nevertheless, of advantage for the preparation of rust-resisting coating compositions from actively rust-inhibiting derivatives of phosphoric acid, i. e., metallic acid phosphates such as barium hydrogen phosphate, or decomposable organic phosphate such as aniline phosphate, etc., which are not brought into solution in the coating composition by the alcohol. Although the alcohol does not cause solution or uniform distribution of these derivatives throughout the coating composition, the undesirable bodying effects produced by these derivatives are counteracted by the alcohol.

As many apparently widely different embodiments of this invention may be made without departing from the spirit and scope thereof, it is to be understood that I do not limit myself to the specific embodiments thereof except as defined in the following claims.

I claim:

1. A coating composition comprising phosphoric acid, a solution of a varnish base in hydrocarbon solvent in which phosphoric acid is insoluble, and an organic solvent for the phosphoric acid which is miscible with said first mentioned solvent, said varnish base being selected from the class consisting of asphalt, resin, and drying oil.

2. A coating composition comprising phosphoric acid, a solution of a varnish base in hydrocarbon solvent in which phosphoric acid is insoluble, and an organic solvent for the phosphoric acid which is miscible with said first mentioned solvent, said varnish base comprising a film forming material containing the acid radicals of drying oil.

3. The coating composition set forth in claim 1 in which the solvent for the phosphoric acid is an alcohol of the class consisting of butyl alcohol and amyl alcohol.

4. The coating composition set forth in claim 2 in which the solvent for the phosphoric acid is an alcohol of the class consisting of butyl alcohol and amyl alcohol.

5. A process for manufacturing rust-resisting coating compositions which comprises dissolving phosphoric acid in a saturated aliphatic monohydric alcohol, and mixing the solution thus obtained with a coating composition containing a varnish base having as its solvent a hydrocarbon solvent in which phosphoric acid is insoluble.

HERBERT O. ALBRECHT.